United States Patent
Harms et al.

(10) Patent No.: US 10,759,323 B1
(45) Date of Patent: Sep. 1, 2020

(54) DOVETAIL ACTUATING MECHANISM

(71) Applicant: Norstar Holdings, LLC, Brookston, TX (US)

(72) Inventors: Abraham Harms, Sumner, TX (US); Wade Gerritt VanNoord, Paris, TX (US)

(73) Assignee: Norstar Holdings, LLC, Brookston, TX (US)

( * ) Notice: Subject to any disclaimer, the term of this patent is extended or adjusted under 35 U.S.C. 154(b) by 0 days.

(21) Appl. No.: 15/691,695

(22) Filed: Aug. 30, 2017

(51) Int. Cl.
*B60P 1/43* (2006.01)

(52) U.S. Cl.
CPC .......... *B60P 1/433* (2013.01); *B60Y 2400/41* (2013.01)

(58) Field of Classification Search
CPC ............. B60P 1/438; B60P 1/433; B60P 1/43
See application file for complete search history.

(56) References Cited

U.S. PATENT DOCUMENTS

| | | | |
|---|---|---|---|
| 3,142,394 A * | 7/1964 | Schwartz | B60P 1/433 414/537 |
| 3,675,800 A | 7/1972 | Weyant et al. | |
| 4,372,727 A | 2/1983 | Fredrickson et al. | |
| 4,730,974 A * | 3/1988 | Andre | B60P 3/07 14/72.5 |
| 5,094,583 A | 3/1992 | Bills et al. | |
| 5,215,426 A | 6/1993 | Bills | |
| 6,394,734 B1 | 5/2002 | Landoll et al. | |
| 6,547,335 B2 * | 4/2003 | McSweeney | B60P 1/34 298/12 |
| 7,658,587 B1 * | 2/2010 | Dierks | B60P 1/43 280/790 |
| 8,075,033 B1 * | 12/2011 | McElroy | B60P 3/04 119/406 |
| 8,794,859 B1 | 8/2014 | Patterson | |
| 9,493,103 B2 | 11/2016 | Engelken et al. | |
| 9,656,588 B2 * | 5/2017 | Robertson | B60P 3/06 |
| 2006/0099061 A1 * | 5/2006 | Smith, Jr. | B60P 1/433 414/537 |
| 2014/0271072 A1 | 9/2014 | Friesen et al. | |
| 2016/0096464 A1 * | 4/2016 | Robertson | B60P 3/06 414/480 |
| 2017/0066360 A1 | 3/2017 | Bushek | |

* cited by examiner

*Primary Examiner* — Mark C Hageman
(74) *Attorney, Agent, or Firm* — Spencer C. Patterson; Grable Martin Fulton PLLC

(57) ABSTRACT

A cargo transporting apparatus includes a flatbed portion and a dovetail portion connected by a hinge. A hinge actuating mechanism includes first and second rigid linkages, the first longitudinal ends of which are connected by a first pivot, and the second longitudinal ends of which, respectively, are pivotably connected to the flatbed portion at a second pivot and the dovetail portion at a third pivot. A linear actuator is connected between one of the rigid linkages and either the flatbed portion or the dovetail portion. In a retracted position, the linear actuator causes the first pivot to be positioned above a line between the second and third pivots and raising of the dovetail portion. In an extended position, the linear actuator causes the first pivot to be positioned below a line between the second and third pivots and lowering of the dovetail portion.

20 Claims, 9 Drawing Sheets

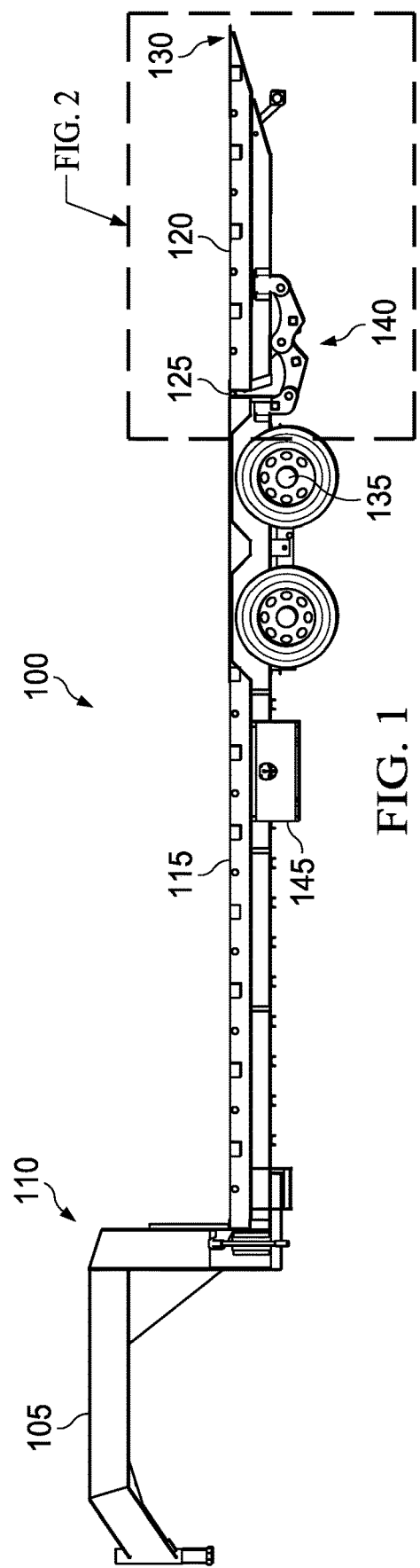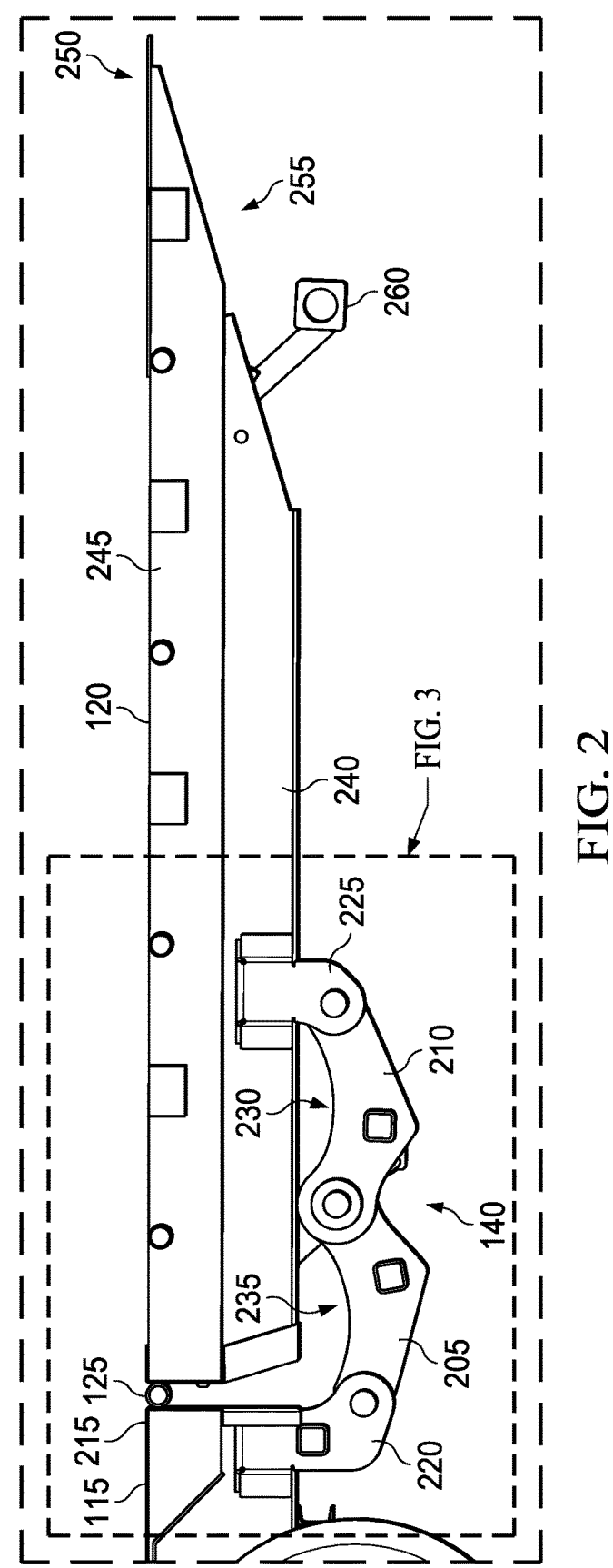

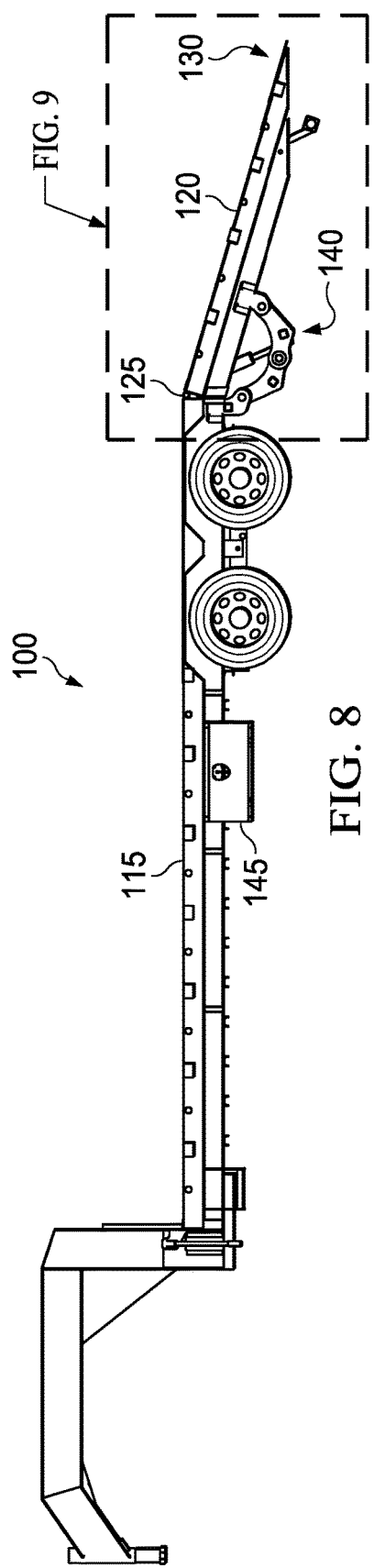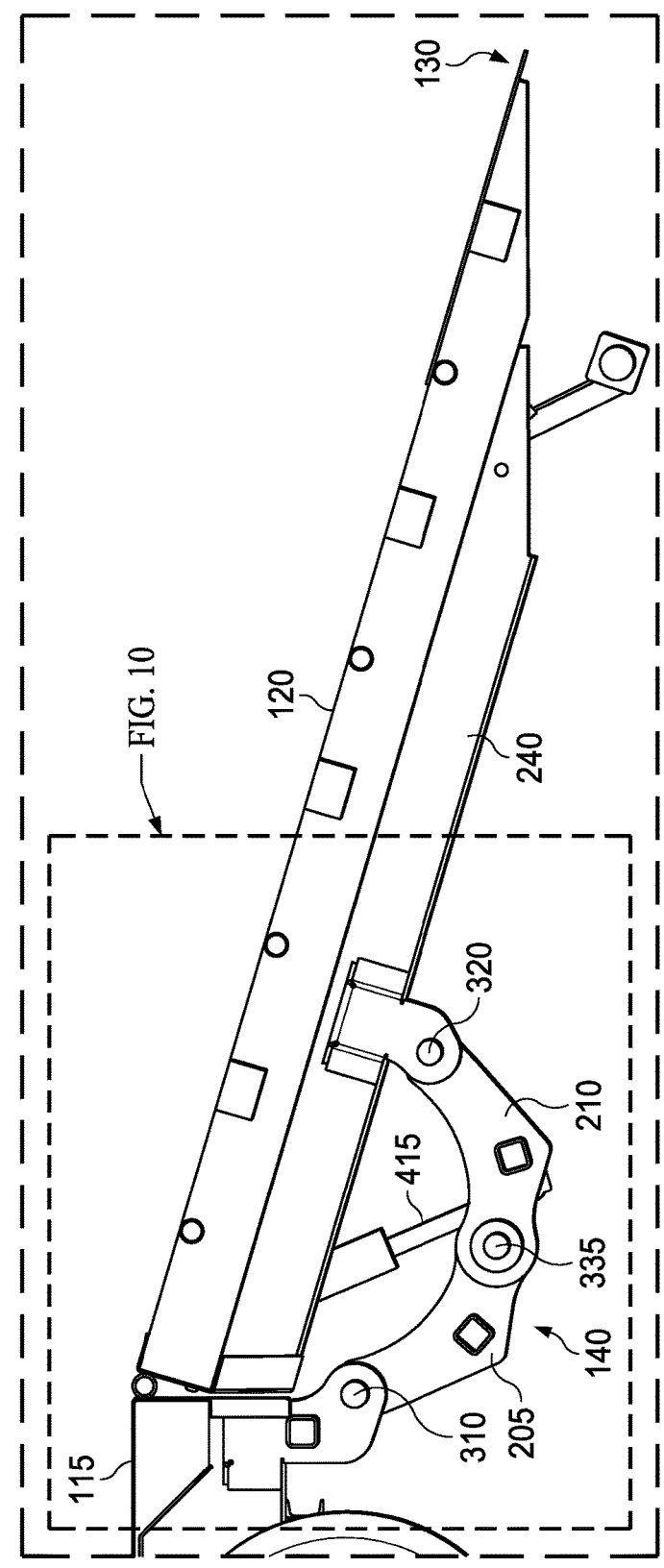

DOVETAIL ACTUATING MECHANISM

BACKGROUND

This description relates to loading ramps, and more particularly to actuating mechanisms for raising and lowering a loading ramp on a trailer or truck.

Large or heavy equipment or other cargo can be transported using a trailer connected to a vehicle or a truck. For example, flatbed-type trailers commonly include a hitch assembly (e.g., a gooseneck) that connects to a truck or tractor, such that the truck or tractor can pull the trailer and its cargo. A flatbed truck can similarly facilitate transportation of large or heavy cargo.

It is often desirable to load the cargo onto the trailer or truck without having to lift the cargo directly onto a top surface of the trailer or truck. For example, automobiles, construction or farm equipment, all-terrain vehicles, or other wheeled vehicles can be more conveniently loaded onto the top surface by rolling the vehicles or equipment onto the trailer or truck. Mechanisms exist that allow for loading of cargo onto a trailer without lifting the cargo. For example, ramps that are connected to an end of a trailer by a hinge can allow the ramps to be flipped over onto the bed of the trailer for transport. Tilt trailers that allow the entire bed of the trailer to tilt so that wheeled vehicles can be rolled onto the trailer similarly facilitate loading of cargo. Such ramps are often very heavy and, as a result, are difficult or impossible for a single user to move the ramp between the open and closed positions.

Flatbed-type trailers have also been developed with a rear end that includes a dovetail portion that is connected to a main portion of the trailer by a hinge that allows the dovetail portion to rotate relative to the main portion. This type of dovetail is generally designed to move between a generally horizontal transport position (i.e., where the dovetail is substantially co-planar with the main flatbed portion of the trailer), and a downwardly-oriented position for loading and unloading (i.e., where the dovetail is positioned at an angle with respect to the main portion of the trailer) such that the dovetail acts as a ramp between the ground and the main flatbed portion of the trailer. When the dovetail is in the downwardly-oriented position, cargo, particularly wheeled cargo, can be more easily loaded onto and unloaded from the trailer. After loading and unloading, the dovetail can be moved to the transport position so that the dovetail has sufficient ground clearance.

While trailers with dovetails facilitate loading and unloading cargo, the size and weight of the dovetails make them difficult to move between the load and transport positions. Many such dovetail trailers use hydraulic systems to actuate the dovetails. Such systems are prone to failure and therefore generally need to include a secondary locking mechanism for securing the dovetail in at least the transport position. The locking mechanism increases the complexity of the system, making it more complicated to operate and more prone to user error or inconvenience. Even with a locking mechanism, the hydraulic cylinders are generally fully or mostly extended for transport (i.e., to hold the dovetail in the upper, transport position), which places a great deal of strain on the hydraulic cylinders because they are supporting the weight of the dovetail. This strain reduces the lifetime of the cylinders and can increase the chances of failure at highly inconvenient times. Furthermore, such dovetail trailers generally have a relatively low hauling weight capacity on the dovetail portion of the trailer. As a result, cargo often must be loaded forward of the dovetail, so that a longer overall trailer is required and/or so that the dovetail is less useful for transport.

SUMMARY

In accordance with aspects described in this specification, a dovetail trailer can be constructed such that a hinge actuating mechanism underneath and between the main flatbed portion of the trailer and the dovetail portion includes two rigid linkages connected at a pivot. One of the linkages is rotatably connected to the bottom of the main flatbed portion of the trailer, while the other linkage is rotatably connected to the bottom of the dovetail portion of the trailer, such that the pivot is between the two rotatable connections along a longitudinal dimension of the trailer. The rotatable connections are spaced apart such that the pivot, when in a raised position, is above a line that runs through the axes of the two rotatable connections and the dovetail is also in a raised position. When the pivot is in a lowered position, the pivot is below a line that runs through the axes of the two rotatable connections and the dovetail is in a lowered position. A hydraulic cylinder can be used to move the hinge actuating mechanism between the raised and lowered positions. For example, one end of the hydraulic cylinder can be connected to one of the rigid linkages at or near the pivot, while the other end is connected to the dovetail or the main flatbed portion of the trailer. Retracting the hydraulic cylinder pulls the pivot to a raised position, and extending the hydraulic cylinder pushes the pivot down to lower the dovetail.

In some implementations, when the dovetail is in the raised position, a portion of the hinge actuating mechanism (e.g., an upper surface of one or both of the rigid linkages) contacts an underside of the trailer and locks the dovetail in place. For example, the hinge actuating mechanism contacting the underside of the trailer prevents the pivot from being able to move upward. At the same time, the weight of the dovetail along with the retracted hydraulic cylinder prevent the pivot from moving downward, thereby keeping the dovetail locked in a raised position. The hinge actuating mechanism can also be constructed such that, when the dovetail is in a lowered position, a portion of the hinge actuating mechanism (e.g., a lower surface of one or both of the rigid linkages) is adapted to contact the ground to provide additional support for the dovetail ramp.

Typically, the trailer includes two or more hinge actuating mechanisms (e.g., one toward each side of the trailer) to provide greater stability. In addition, one or more braces (e.g., in the form of square tubing) run between the hinge actuating mechanisms to reinforce rigidity and prevent deformation. For example, a square tube can be connected between corresponding rigid linkages on each side of the trailer. Additional supports (e.g., gusset plates between the square tubing and the rigid linkages) can also be used to provide additional strength and rigidity. Moreover, each hinge actuating mechanism can be constructed from appropriately shaped steel plates that are spaced apart, for example, by a cylindrical tube and/or cylindrical pins or rods that also form the pivot and rotatable connections.

In one implementation, a cargo transporting apparatus includes a bed portion and a tail portion connected to the bed portion by a main hinge. A hinge actuating mechanism includes first and second rigid linkages, each having a first longitudinal end and a second longitudinal end. The first longitudinal ends of the first and second rigid linkages are connected by a first pivot, the second longitudinal end of the first rigid linkage is pivotably connected to the bed portion at a second pivot, and the second longitudinal end of the second rigid linkage is pivotably connected to the tail portion at a third pivot. A linear actuator has a first end connected to at least one of the first and second rigid linkages and a second end connected to one of the bed portion or the tail portion. The linear actuator, when in a retracted position, causes the first pivot to be positioned above a line between the second and third pivots and the tail portion to be in a raised position. When in an extended position, the linear actuator causes the first pivot to be positioned below a line between the second and third pivots and the tail portion to be in a lowered position.

Specific implementations can include one or more of the following features. The hinge actuating mechanism is constructed such that at least one of the first linkage or the second linkage contacts an underside of the tail portion when the linear actuator is in a retracted position. At least one of the first linkage or the second linkage is configured to contact the underside of the tail portion along a significant portion of a longitudinal dimension of the respective linkage. The hinge actuating mechanism is constructed such that weight of the tail portion is removed from the linear actuator when at least one of the first linkage or the second linkage is in contact with the underside of the tail portion. The linear actuator, when in the retracted position, holds the at least one of the first linkage or the second linkage against the underside of the tail portion. The second end of the linear actuator is connected to the tail portion. First and second hinge actuating mechanisms are spaced apart along a dimension of an axis of the main hinge, and a brace runs between at least one of the corresponding first linkages or the corresponding second linkages of the first and second hinge actuating mechanisms. The hinge actuating mechanism is constructed such that at least one of the first linkage or the second linkage is adapted to contact a support surface when the linear actuator is in at least a substantially extended position. The first end of the linear actuator is connected to the second rigid linkage and the second end of the linear actuator is connected to the tail portion. The second longitudinal end of the first rigid linkage is pivotably connected to the bed portion longitudinally adjacent to the main hinge and the second longitudinal end of the second rigid linkage is pivotably connected to the tail portion at a longitudinal distance from the main hinge. The first end of the linear actuator is connected to the second rigid linkage via a brace between the second rigid linkage of the hinge actuating mechanism and a corresponding second rigid linkage of a second hinge actuating mechanism connected to the bed portion and tail portion and laterally spaced from the hinge actuating mechanism.

In another implementation, a trailer includes a first load-bearing surface and a second load-bearing surface connected to the first load-bearing surface by a hinge. A first rigid linkage has a first longitudinal end and a second longitudinal end. The first longitudinal end of the first rigid linkage is pivotably connected to the first load-bearing surface at a first pivot. A second rigid linkage has a first longitudinal end and a second longitudinal end, and the second longitudinal end of the first rigid linkage is pivotably connected to the first longitudinal end of the second rigid linkage at a second pivot. The second longitudinal end of the second rigid linkage is pivotably connected to the second load-bearing surface at a third pivot. When a rotational axis of the second pivot is positioned above a line between rotational axes of the first and third pivots, the second load-bearing surfaces is maintained in a raised position and, when the rotational axis of the second pivot is positioned below a line between the rotational axes of the first and third pivots, the second load-bearing surfaces is in a lowered position.

Specific implementations can include one or more of the following features. A linear actuator has a first end connected to at least one of the first and second rigid linkages and a second end connected to one of the first load-bearing surface or the second load-bearing surface. The linear actuator, when in a retracted position, causes the rotational axis of the second pivot to be positioned above the line between the rotational axes of the first and third pivots, and the linear actuator, when in an extended position, causes the rotational axis of the second pivot to be positioned below the line between the rotational axes of the first and third pivots. When the second load-bearing surface is in the lowered position, the first and second load-bearing surfaces are rotated with respect to one another relative to when the second load-bearing surface is in the raised position. When the second load-bearing surface is in the lowered position, the second load-bearing surface provides a ramp to the first load-bearing surface. At least one of the first and second rigid linkages is adapted to contact an underside of the second load-bearing surface in the raised position and to thereby remove weight from the linear actuator. The trailer can also include a third rigid linkage having a first longitudinal end and a second longitudinal end, wherein the first longitudinal end of the third rigid linkage is pivotably connected to the first load-bearing surface at a fourth pivot, and a fourth rigid linkage having a first longitudinal end and a second longitudinal end. The second longitudinal end of the third rigid linkage is pivotably connected to the first longitudinal end of the fourth rigid linkage at a fifth pivot, and the second longitudinal end of the fourth rigid linkage is pivotably connected to the second load-bearing surface at a sixth pivot. When a rotational axis of the fifth pivot is positioned above a line between rotational axes of the fourth and sixth pivots, the second load-bearing surfaces is maintained in a raised position and, when the rotational axis of the fifth pivot is positioned below a line between the rotational axes of the fourth and sixth pivots, the second load-bearing surfaces is in a lowered position. The trailer further includes a first linear actuator having a first end connected to at least one of the first and second rigid linkages and a second end connected to one of the first load-bearing surface or the second load-bearing surface. A second linear actuator has a first end connected to at least one of the third and fourth rigid linkages and a second end connected to one of the first load-bearing surface or the second load-bearing surface. The first and second linear actuators, when in a retracted position, cause the rotational axis of the second and fifth pivots to be positioned above the lines between the rotational axes of the first and third pivots and the fourth and sixth pivots, respectively, and the linear actuator, when in an extended position, causes the rotational axis of the second and fifth pivots to be positioned below the line between the rotational axes of the first and third pivots and the fourth and sixth pivots, respectively. The trailer can include a controller for controlling operating of the first and second linear actuators.

Implementations described in this specification can provide one or more of the following advantages. The hinge actuating mechanism supports the weight of the dovetail portion of the trailer and any cargo on top of the dovetail. The hydraulic cylinders are not load-bearing when the dovetail portion is in a raised or transport position. A secondary locking mechanism is not necessary; rather, the hinge actuating mechanism serves as a self-locking mechanism, particularly in combination with the retracted hydraulic cylinders. Both sides of the hydraulic cylinder can be connected on the same side of the trailer's main hinge (e.g., both ends of the hydraulic cylinder can be connected on the dovetail side of the main hinge). The dovetail portion of the trailer can have a greater dynamic load-bearing capacity (i.e., when the trailer is in motion). The hinge actuating mechanism can contact the ground to provide added stability or support when the dovetail is in a lowered position. The hinge actuating mechanism can be used on a truck or on trailers other than flatbed trailers (e.g., on the second level of a dual-level automobile transport trailer).

DESCRIPTION OF DRAWINGS

FIG. 1 is a side view of a flatbed dovetail trailer.

FIG. 2 is a closeup side view of the dovetail portion and the hinge actuating mechanism of the trailer of FIG. 1.

FIG. 8 is a side view of the flatbed dovetail trailer of FIG. 1 with the dovetail portion in the lowered position.

FIG. 9 is a closeup side view of the dovetail portion and the hinge actuating mechanism of the trailer of FIG. 8.

Like reference symbols in the various drawings indicate like elements.

DETAILED DESCRIPTION

Figure 10:
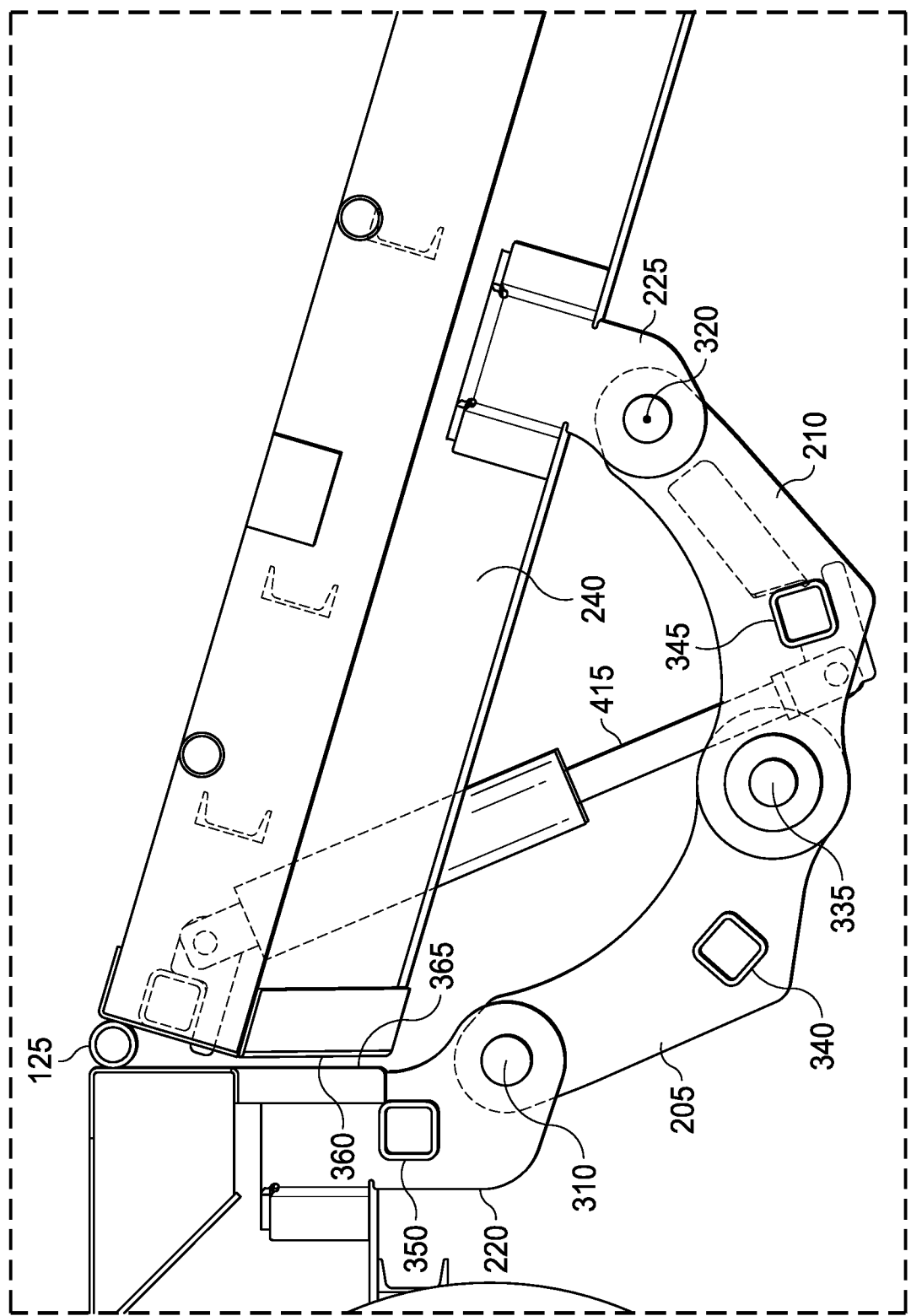
FIG. 10 is a closeup exterior side view of the area of the trailer with the hinge actuating mechanism of FIGS. 8 and 9.

FIG. 1 is a side view of a flatbed dovetail trailer 100. In the illustrated example, the trailer 100 is a gooseneck trailer and thus includes a gooseneck portion 105 on a front end 110 of the trailer. The trailer 100 includes a main flatbed portion 115 and a dovetail portion 120 connected by a main hinge 125. The dovetail portion 120 is located toward a rear end 130 of the trailer. The main hinge 125 is located rearward of a rear axle 135 and rear axle hanger kit. A hinge actuating mechanism 140 is attached to the main flatbed portion 115 and the dovetail portion 120 and is used to rotate the dovetail portion 120 between a raised, transport position (as depicted in FIG. 1) and a lowered, load/unload position (as shown in FIGS. 8-10). Raising and lowering of the dovetail portion 120 can be performed using one or more hydraulic cylinders or other linear actuators (e.g., a pneumatic cylinder or an electric cylinder), which are mostly hidden from view in FIG. 1. Extension and retraction of the linear actuators can be controlled by hardware and/or electronics partially contained in a control box 145. For example, the control box 145 can contain a pump and valves necessary to extend and retract one or more hydraulic cylinders and a manual control switch for controlling extension and retraction of the hydraulic cylinders. The control system can include remote control components, such that an operator does not need to access the control box 145 to be able to raise and lower the dovetail portion 120. In some implementations, the trailer 100 or the hinge actuating mechanism 140 can include a secondary locking mechanism (e.g., a removable pin to prevent accidental lowering of the dovetail portion 120), although the hinge actuating mechanism 140 is generally self-locking, as further discussed below.

Although FIG. 1 depicts a flatbed gooseneck trailer 100, aspects of the apparatus described in this specification can be used with other types of trailers, with trucks, or in other circumstances where it is desirable to have a deck that can be raised and lowered (e.g., to form a ramp). Other features of the trailer 100 depicted in FIG. 1 (e.g., the use of a dual axle) are also shown for illustrative purposes and are not intended to limit the scope of this description.

For purposes of the following discussion (unless otherwise apparent from the description and drawings), a longitudinal dimension of the trailer 100 and its components runs in the direction between the front end 110 and the rear end 130 of the trailer 100 and perpendicular to an axis of the main hinge 125. A lateral dimension of the trailer 100 and its components runs in the direction of the axis of the main hinge 125.

FIG. 2 is a closeup side view of the dovetail portion 120 and the hinge actuating mechanism 140 of the trailer 100 of FIG. 1. The hinge actuating mechanism 140 includes a front rigid linkage 205 and a rear rigid linkage 210. The front rigid linkage 205 is connected to a rear end 215 of the main flatbed portion 115 below the main hinge 125 via a front bracket 220. Preferably, the front bracket 220 is rigidly attached to the main flatbed portion 115. The rear rigid linkage 210 is connected to the dovetail portion 120 at a distance rearward from the main hinge 125 via a rear bracket 225. Preferably, the rear bracket 225 is rigidly attached to the dovetail portion 120. With the dovetail 120 in the raised position, the hinge actuating mechanism 140 can include a first arc 230 formed by the front bracket 220 and the front rigid linkage 205 and a second arc 235 formed by the rear rigid linkage 210 and the rear bracket 225.

The dovetail portion 120 includes a primary frame 240 that runs the longitudinal length of the dovetail portion 120 and an outer frame 245 located laterally outward from the primary frame 240. The primary frame 240 can provide the primary weight-bearing support for the trailer 100, while the outer frame 245 can provide secondary weight-bearing support and be located at the lateral edges of the trailer 100. The rear bracket 225 can be attached to the primary frame 240. In an example implementation, the primary frame 240 includes two parallel steel I-beams that are spaced apart laterally from a centerline of the trailer. The outer frame 245 can include two smaller steel beams. The main flatbed portion 115 can also include a corresponding primary frame and outer frame including steel beams that run the longitudinal length of the main flatbed portion 115. As shown, a rear end 250 of the dovetail 120 also includes a tapered underside 255 that may generally lay flat on the ground when the dovetail portion 120 is lowered and the trailer 100 is on generally flat ground. As is known in the industry, a bumper 260 (e.g., that includes rear lights, reflectors, and the like) may retract (e.g., using a spring-loaded mechanism) when the dovetail portion 120 is lowered.

Figure 3:
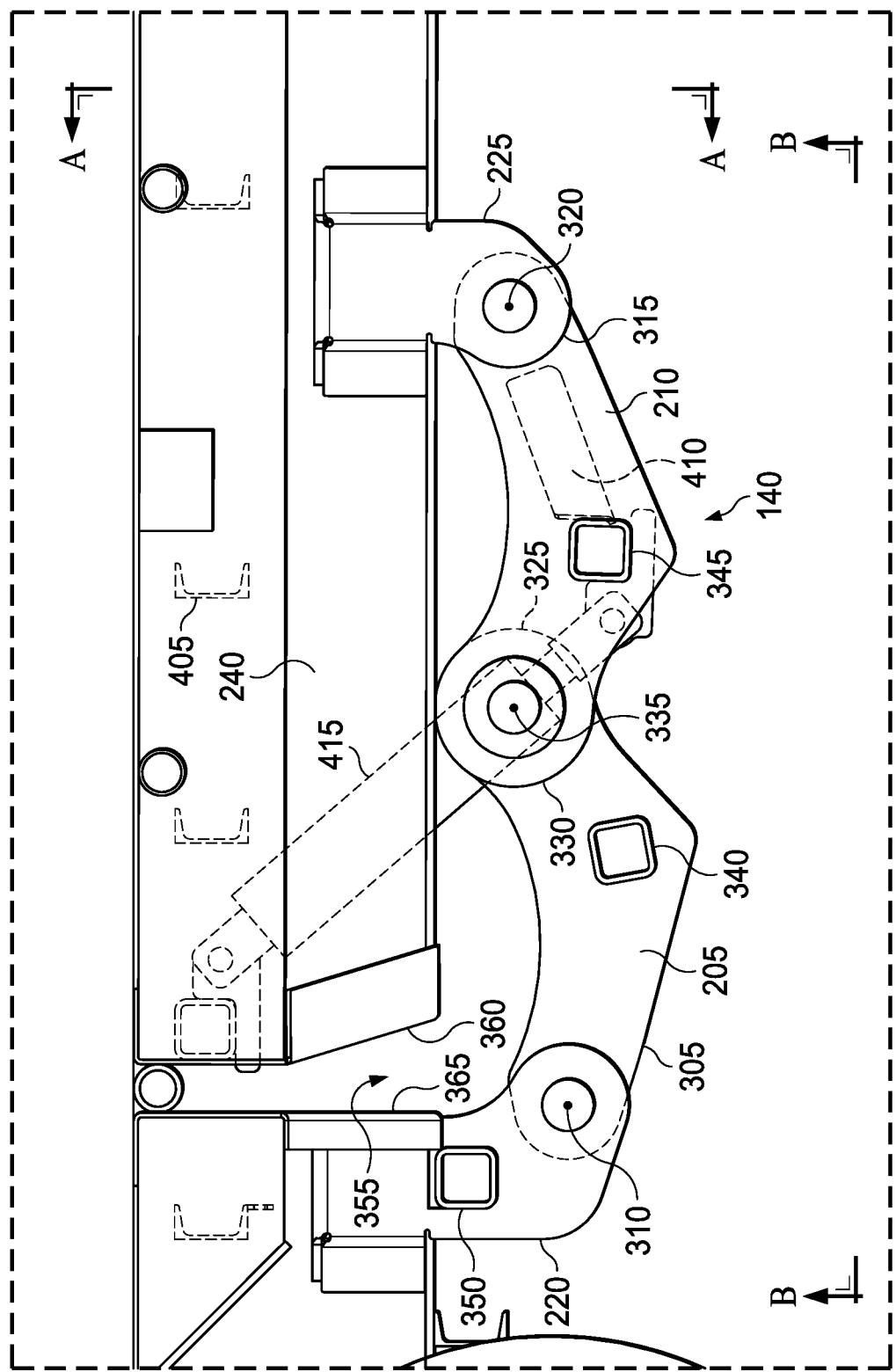
FIG. 3 is a closeup exterior side view of the area of the trailer with the hinge actuating mechanism of FIGS. 1 and 2.

FIG. 3 is a closeup exterior side view of the area of the trailer 100 with the hinge actuating mechanism 140 of FIGS. 1 and 2. A front longitudinal end 305 of the front rigid linkage 205 is connected to the front bracket 220 at a front pivot 310, which allows the front rigid linkage 205 to rotate relative to the front bracket 220. A rear longitudinal end 315 of the rear rigid linkage 210 is connected to the rear bracket 225 at a rear pivot 320, which allows the rear rigid linkage 210 to rotate relative to the rear bracket 225. A rear longitudinal end 325 of the front rigid linkage 205 is connected to a front longitudinal end 330 of the rear rigid linkage 210 at a center pivot 335, which allows the front rigid linkage 205 to rotate relative to the rear rigid linkage 210. With the dovetail portion 120 in the raised position, the rear longitudinal end 325 of the front rigid linkage 205 and/or the front longitudinal end 330 of the rear rigid linkage 210 contact an underside of the primary frame 240. Also in this position, an axis of the center pivot 335 is above a line between an axis of the front pivot 310 and an axis of the rear pivot 320. In general, these axes are parallel or substantially parallel to one another, meaning that the axis of the center pivot 335 is above a plane that passes through the axis of the front pivot 310 and the axis of the rear pivot 320. In some implementations, the front rigid linkage 205 and/or the rear rigid linkage 210 (alone or combined with the brackets 220 and 225) do not have an arc shape, but have a thicker dimension between the longitudinal ends and/or extend farther downward between the longitudinal ends when the hinge actuating mechanism 140 is in the raised position than at the longitudinal ends.

To provide stabilizing support between the hinge actuating mechanism 140 attached to one side of the primary frame 240 and the hinge actuating mechanism 140 attached to the other side of the primary frame 240, a front square tube 340 or other brace (e.g., angle iron or cylindrical tubing) runs between and is connected to the front rigid linkages 205 to provide a rigid lateral stabilizer. Similarly, a rear square tube 345 or other brace runs between and is connected to the rear rigid linkages 210 to provide a rigid lateral stabilizer. An additional square tube 350 or other brace runs between and is connected to the front brackets 220 on each lateral side to stabilize the front brackets 220 and help connect them to the primary frame of the main flatbed portion 115.

The front end of the dovetail portion 120 includes additional clearance (at 355) so that when the dovetail portion 120 is lowered, the lower end of the dovetail primary frame 240 or other parts of the dovetail 120 do not contact the main flatbed portion 115 to prevent lowering. In some implementations, the additional clearance can be designed so that a front surface 360 of the dovetail portion 120 contacts a rear surface 365 of the main flatbed portion 115 when the dovetail portion 120 is fully lowered (i.e., to provide a stop). Alternative implementations can provide similar clearance, for example, on the rear end of the main flatbed portion 115, or the beams of the primary frame 240 of the dovetail can be laterally offset from the beams of the primary frame of the main flatbed portion 115 to prevent contact between the beams as the dovetail 120 is lowered.

Figure 4:
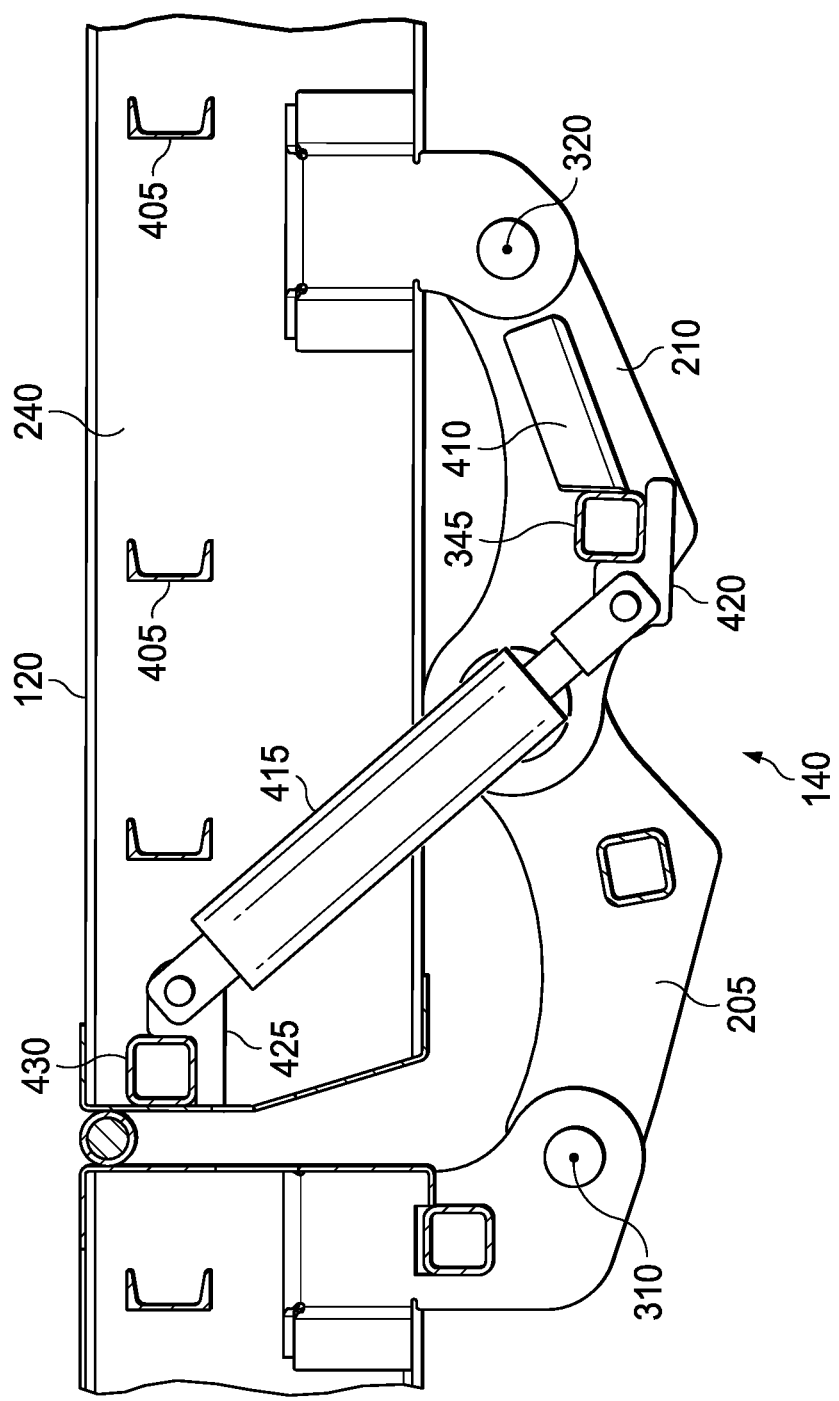
FIG. 4 is a closeup interior side view of the area of the trailer with the hinge actuating mechanism of FIGS. 1 and 2.

FIG. 4 is a closeup interior side view of the area of the trailer 100 with the hinge actuating mechanism 140 of FIGS. 1 and 2. Several features of the trailer 100 that are hidden from view and depicted in dashed form in FIG. 3 are shown in greater detail in FIG. 4. For example, lateral supports 405 between each outer frame 245 and the primary frame 240 and, in most cases, between the beams of the primary frame 240 can provide a support for a flatbed upper surface (or floor) of the dovetail portion 120. A gusset 410 provides additional stabilizing support between the rear square tube 345 and the rear rigid linkage 210. In some implementations, a similar gusset can be used for the front square tube 340. A hydraulic cylinder 415 is attached between a lower bracket 420 attached to the rear square tube 345 and an upper bracket 425 attached to a square tube 430 that runs, for example, between the beams of the primary frame 240 of the dovetail portion 120. When the hydraulic cylinder 415 in the retracted position (as depicted), the front and rear rigid linkages 205 and 210 in the vicinity of the center pivot 335 contact the underside of the primary frame 240. In this position, the hinge actuating mechanism 140 is locked in position such that the hinge actuating mechanism 140 supports the weight of the dovetail portion 120. At the same time, the weight of the dovetail portion 120 (along with the retracted hydraulic cylinder 415) holds the hinge actuating mechanism 140 in the raised position (i.e., because lowering the hinge actuating mechanism 140 and thus the dovetail portion 120 requires slightly raising the dovetail portion 120 to allow the center pivot 335 to fall below a line between the axis of the front pivot 310 and the axis of the rear pivot 320).

Figure 5:
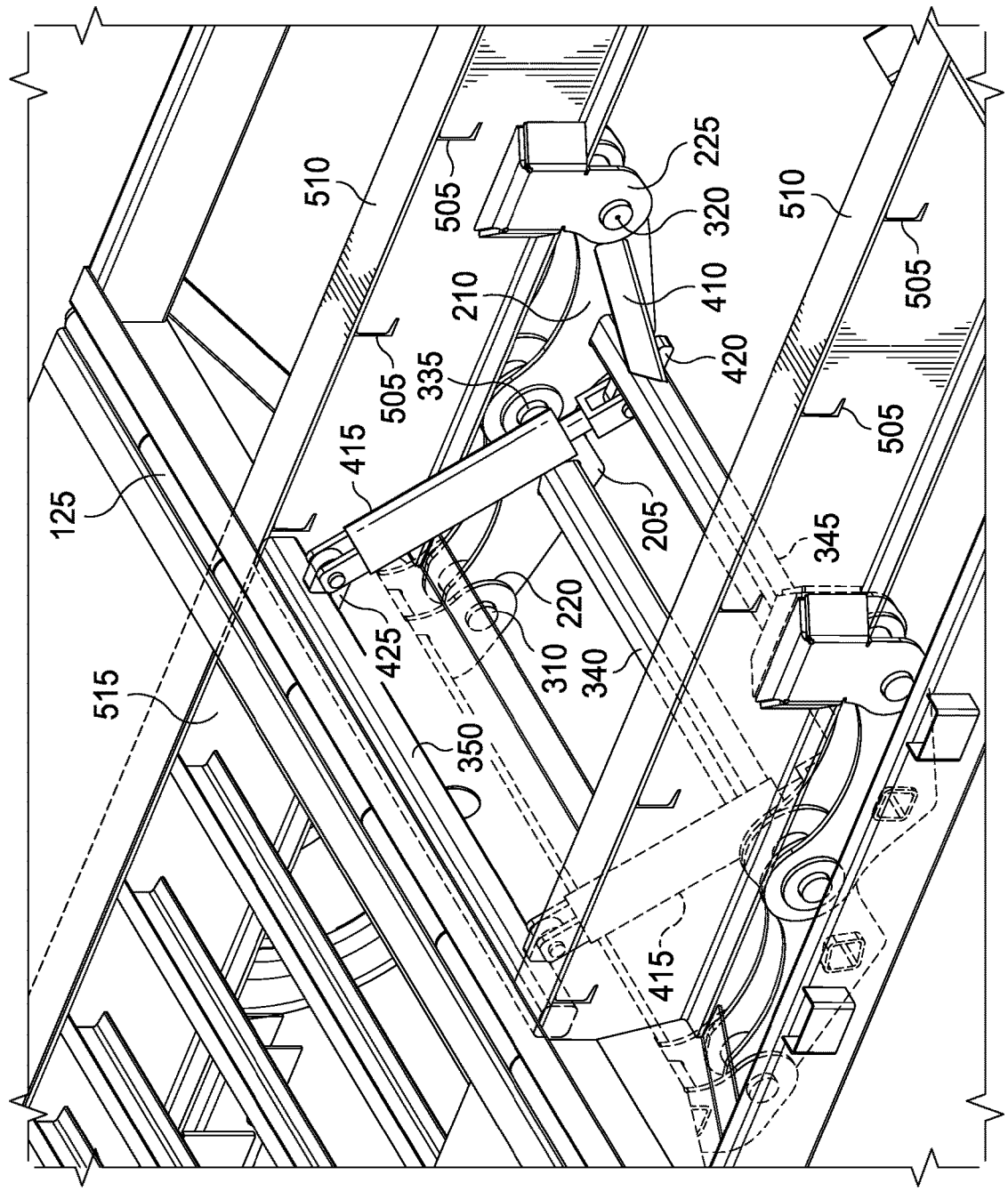
FIG. 5 is a perspective, partial see-through cutaway view of the trailer showing dual hinge actuating mechanisms and hydraulic cylinders in the raised position.
Figure 6:
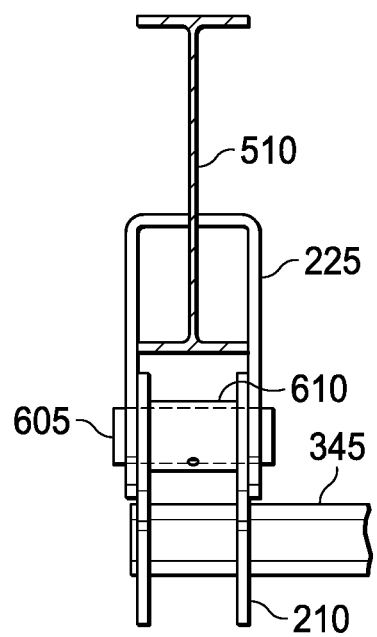
FIG. 6 is a cross-sectional view of a single hinge actuating mechanism and corresponding I beam of the primary frame along line A-A of FIG. 3.
Figure 7:
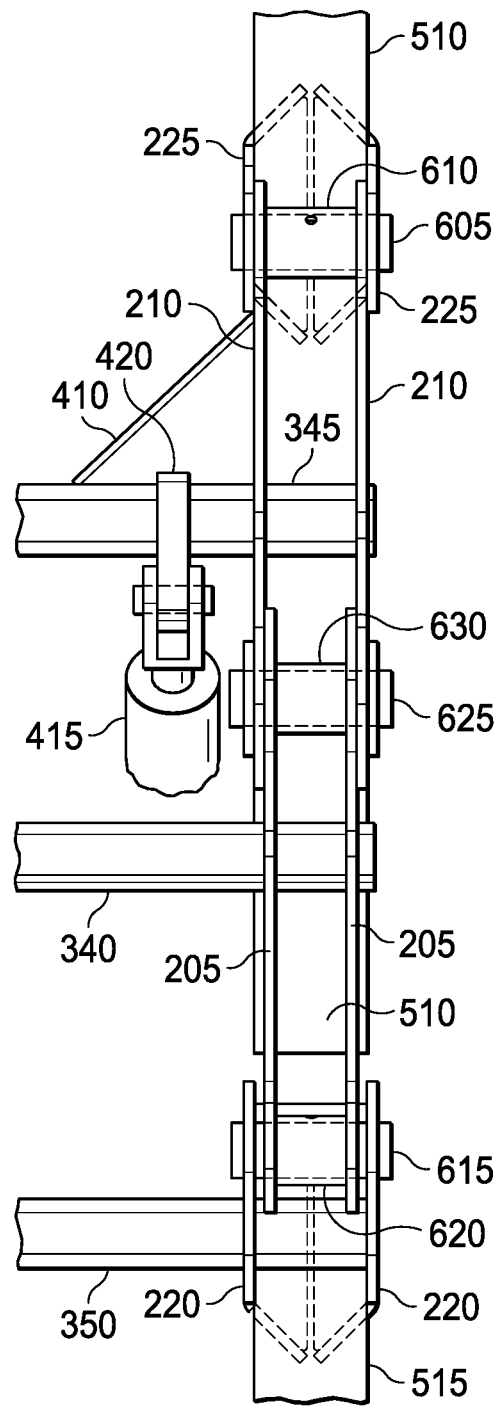
FIG. 7 is a cross-sectional view of a single hinge actuating mechanism along line B-B of FIG. 3.

FIGS. 5-7 provide additional views of the hinge actuating mechanism 140 shown in FIGS. 1-4 in the raised position. FIG. 5 is a perspective, partial see-through cutaway view of the trailer 100 showing dual hinge actuating mechanisms 140 and hydraulic cylinders 415 in the raised position. The position of the lateral supports 405 is indicated at 505, but the lateral supports 405 are omitted to avoid obscuring other components. FIG. 6 is a cross-sectional view of a single hinge actuating mechanism 140 and corresponding I beam 605 of the primary frame 240 along line A-A of FIG. 3. FIG. 7 is a cross-sectional view of a single hinge actuating mechanism 140 along line B-B of FIG. 3.

As discussed above, the trailer 100 can include two hinge actuating mechanisms 140, one for each beam 510 of the primary frame 240. Two hydraulic cylinders 415 are attached between the lower bracket 420 attached to the rear square tube 345 and the upper bracket 425 attached to the additional square tube 350. The hydraulic cylinders 415 can have share a common control system or can be implemented with separate pumps and valves, preferably controlled by a common switch.

In general, the components of the two hinge actuating mechanisms 140 are substantially identical to (or in some cases are mirror images of) the components on the other lateral beam 510 of the primary frame 240. The rear bracket 225 is attached (e.g., welded) to the lateral beam 510 to provide a rigid attachment point for the rear rigid linkage 210. Similarly, the front bracket 220 is attached (e.g., welded) to a lateral beam 515 of the main flatbed portion 115 to provide a rigid attachment point for the front rigid linkage 205. The rear pivot 320 is constructed of a pin 605 attached (e.g., welded) to the rear bracket 225 that runs through a hollow cylinder 610 attached (e.g., welded) to the rear rigid linkage 210. The pin 605 and the hollow cylinder 610 can have dimensions such that the pin 605 can rotate within the hollow cylinder 610 while substantially preventing radial movement. Similarly, the front pivot 310 is constructed of a pin 615 attached to the front bracket 220 that runs through a hollow cylinder 620 attached to the front rigid linkage 205. The pin 615 and the hollow cylinder 620 can have dimensions such that the pin 615 can rotate within the hollow cylinder 620 while substantially preventing radial movement. Finally, the center pivot 335 is constructed of a pin 625 attached to the front rigid linkage 205 that runs through a hollow cylinder 630 attached to the rear rigid linkage 210.

Again, the pin 625 and the hollow cylinder 630 can have dimensions such that the pin 625 can rotate within the hollow cylinder 630 while substantially preventing radial movement.

In an example implementation, the rigid linkages 205 and 210, the brackets 220 and 225, and the gussets 410 can be constructed of steel plate (e.g., ⅜" thick) shaped and welded so as to provide the desired interconnections and interfaces. For example, the gussets 410 can be generally triangular with at least one side being folded over at 90 degree angle to provide greater strength. In addition, the brackets 220 and 225 can be formed by cutting and bending the steel plate into a shape that allows the bracket to "wrap" around the I beam 510. Strength and stability can also be increased by constructing each of the rigid linkages 205 and 210 and the brackets 220 and 225 as two mirror-image halves that are connected together by at least one pin or hollow cylinder. For example, each rear rigid linkage 210 can be constructed from two substantially identical pieces cut from a steel plate and connected by the hollow cylinder 610 and pin 625. Each front rigid linkage 205 can be constructed from two substantially identical pieces cut from a steel plate and connected by the hollow cylinders 620 and 630. The rear bracket 225 can be constructed from two substantially mirror-image pieces cut from a steel plate, shaped to attach to the I beam 510, and connected by the pin 605. Finally, the front bracket 220 can be constructed from two substantially mirror-image pieces cut from a steel plate, shaped to attach to the I beam 515, and connected by the pin 615.

FIG. 8 is a side view of the flatbed dovetail trailer 100 of FIG. 1 with the dovetail portion 120 in the lowered position. FIG. 9 is a closeup side view of the dovetail portion 120 and the hinge actuating mechanism 140 of the trailer 100 of FIG. 8. FIG. 10 is a closeup exterior side view of the area of the trailer 100 with the hinge actuating mechanism 140 of FIGS. 8 and 9. When the hydraulic cylinder 415 is extended, the front rigid linkage 205 and the rear rigid linkage 210 are no longer in contact with an underside of the primary frame 240, and the axis of the center pivot 335 is below a line between the axis of the front pivot 310 and the axis of the rear pivot 320. Because these axes are generally parallel or substantially parallel to one another, as discussed above, the axis of the center pivot 335 is below a plane that passes through the axis of the front pivot 310 and the axis of the rear pivot 320. In this lowered position, the square tubes 340, 345, and 350 continue to provide stabilizing support to help prevent the hinge actuating mechanisms from warping as the dovetail 120 is lowered.

Lowering the center pivot 335 has the effect of bringing the front bracket 220 and the rear brake 225 closer to one another, which in turn results in the dovetail portion 120 rotating about the main hinge 125 relative to the main flatbed portion 115 and lowering the rear end 130 of the trailer toward the ground. In addition, the hinge actuating mechanism 140 can be dimensioned such that at least one of the front or rear rigid linkages 205 and 210 contact the ground when the dovetail portion 120 is fully lowered (e.g., to provide additional support and stability). Also at the lowered position, the front surface 360 of the dovetail portion 120 can contact a rear surface 365 of the main flatbed portion 115.

Figure 11A:
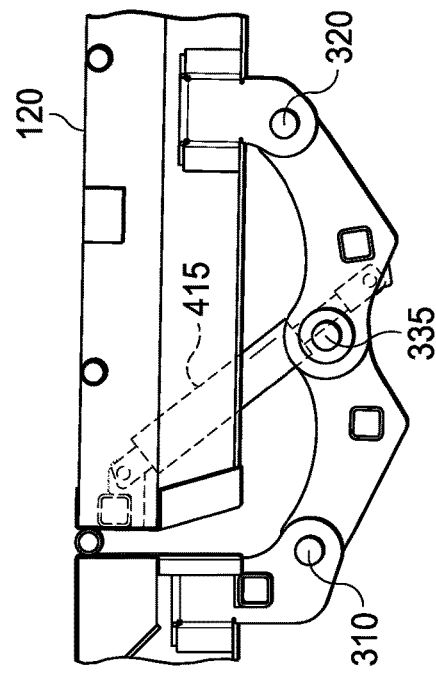
FIGS. 11A-11D depict a process of moving the dovetail portion from a raised position to a lowered position.
Figure 11B:
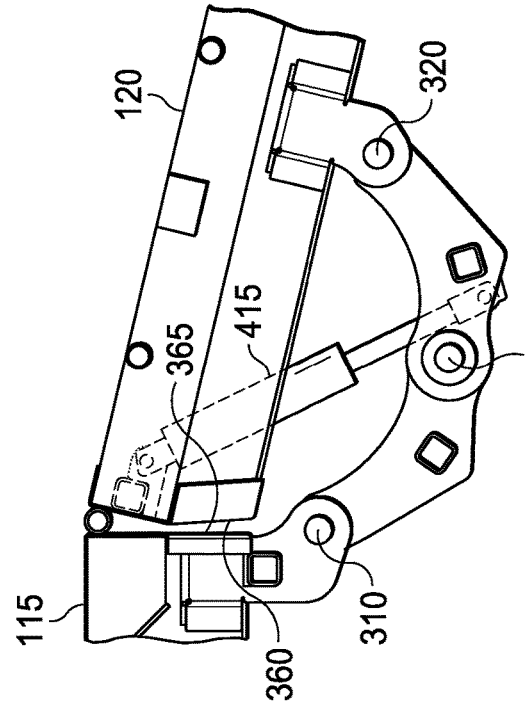
Figure 11C:
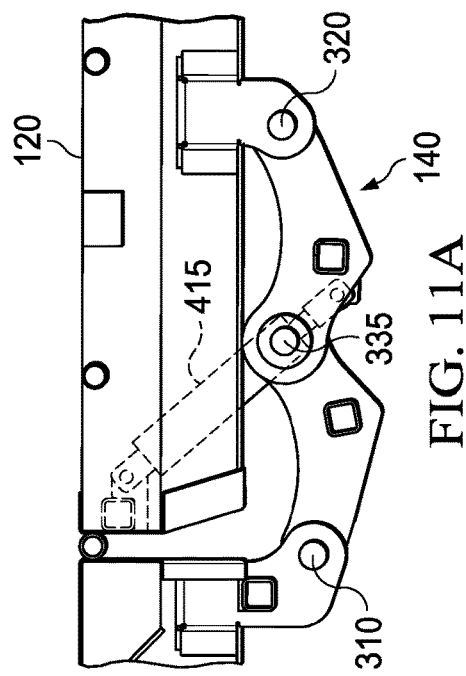
Figure 11D:
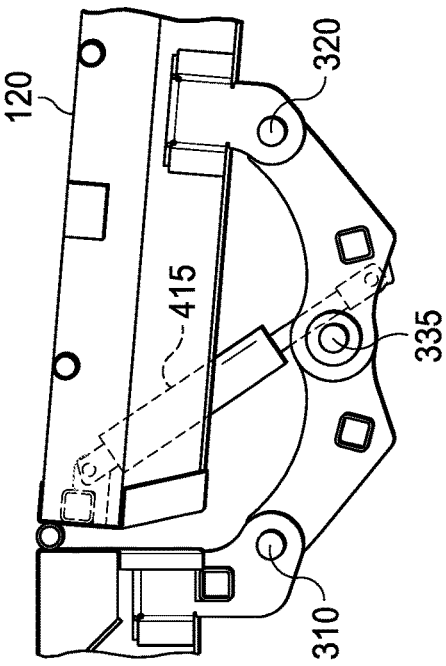

FIGS. 11A-11D depict a process of moving the dovetail portion 120 from a raised position to a lowered position. In FIG. 11A, the hydraulic cylinder 415 is substantially retracted, which causes the hinge actuating mechanism 140 to be in a raised position, and thus the dovetail portion 120 is also in a raised or transport position. As the hydraulic cylinder 415 extends, it initially causes the dovetail portion 120 to lift slightly (not shown) until the axis of the center pivot 335 is directly between the axis of the front pivot 310 and the axis of the rear pivot 320. As the hydraulic cylinder 415 continues to extend (as shown in FIG. 11B), the center pivot 335 lowers below a line between the axis of the front pivot 310 and the axis of the rear pivot 320 and the dovetail portion 120 begins to lower. Additional extension of the hydraulic cylinder 415 causes additional lowering of the center pivot 335 and additional lowering of the rear end of the dovetail portion 120 (as shown in FIG. 11C) until the hydraulic cylinder 415 is fully extended and/or the dovetail portion 120 reaches the ground or is fully lowered (as shown in FIG. 11D). At this point, the front surface 360 of the dovetail portion 120 may or may not contact a rear surface 365 of the main flatbed portion 115 depending on the situation and/or the design of the trailer 100. For example, slight variations in the flatness of the ground can impact how far down the dovetail portion 120 goes before contacting the ground.

Figure 12:
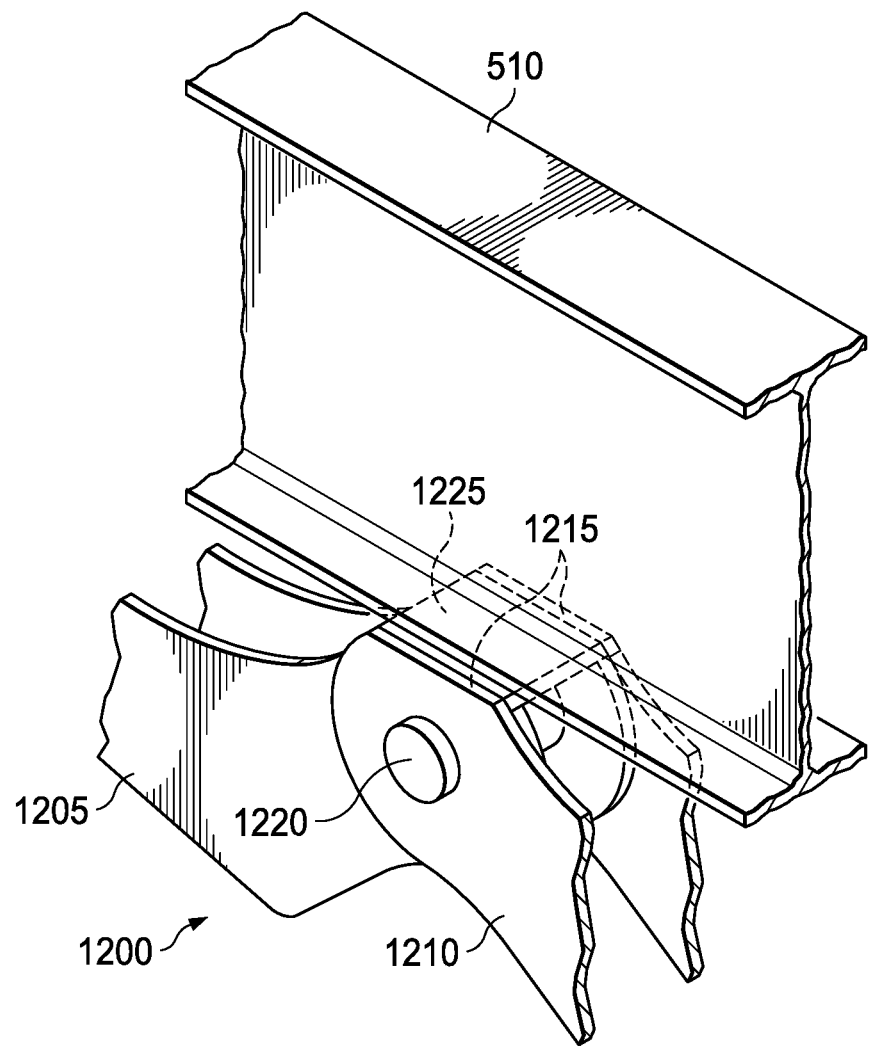
FIG. 12 is a perspective, cutaway view of an alternative hinge actuating mechanism.

FIG. 12 is a perspective, cutaway view of an alternative hinge actuating mechanism 1200. The hinge actuating mechanism 1200 is substantially similar to the hinge actuating mechanism 140 discussed above except that one or both of the front rigid linkage 1205 and the rear rigid linkage 1210 have a substantially flat top surface 1215 near the center pivot 1220 such that when the hinge actuating mechanism 1200 is in the raised position, the flat top surface 1215 contacts the underside of the main frame 240 across a greater surface area in the longitudinal dimension. For example, the flat top surface 1215 contacts the underside of the main frame 240 across a significant portion (e.g., greater than 5% or greater than 10% of the distance between the front pivot and the center pivot 1220) of the longitudinal dimension of the rigid linkage 1205 and/or 1210. This design can help provide greater support and stability. In general, the flat top surface 1215 can simply correspond to a flat edge of a steel plate from which the linkage 1205 and/or 1210 is constructed. Alternatively or in addition, the flat top surface 1215 can include a flat plate 1225 attached between the two sides of either the front rigid linkage 1205 or the rear rigid linkage 1210 (e.g., whichever one is narrower and thus fits between the sides of the wider of the two).

Alternative implementations can have a main hinge 125 located at a different position along the length of the trailer 100. For example, the main hinge 125 can be located farther forward or backward than depicted and described. In addition, the central pivot 335 can, instead of being positioned under the front end of the dovetail portion 120 could be positioned under the rear end of the flatbed portion 115. Similarly, the brackets 220 and 225 could be moved forward or backward relative to the main hinge 125. The top end of the hydraulic cylinder 415 could be connected to either the main flatbed portion 115 or the dovetail portion 120. The hydraulic cylinders 415 or other linear actuators can be connected using clovis pins and cotter pins to facilitate convenient construction, removal, servicing, and replacement. A linear actuator may also include actuators that cause the central pivot 335 to move in a generally linear direction without requiring the actuator to move in a purely linear motion.

The front and rear rigid linkages 205 and 210 or 1205 and 1210 can have different shapes than depicted and can be constructed from materials other than metal plate. The hinge actuating mechanism 140 or 1200 can be constructed such that the raised position of the dovetail portion 120 corresponds to the center pivot 335 being directly substantially between the axis of the front pivot 310 and the axis of the rear pivot 320 (e.g., if a retracted linear cylinder or a secondary locking mechanism is used to prevent the center pivot 335 from inadvertently falling below the line between the axis of the front pivot 310 and the axis of the rear pivot 320).

Attachments or connections between different components are not necessarily direct but can include indirect attachments or connections. For example, the rigid linkages can be connected to the main flatbed portion 115 or the dovetail portion 120 indirectly via a bracket (e.g., brackets 220 and 225). The hinge actuating mechanism 140 can contact portions of the underside of the trailer and dovetail other than the primary frame. More than two hinge actuating mechanisms and/or linear actuators can be used.

While this specification contains many implementation details, these should not be construed as limitations on the scope of the invention or of what may be claimed, but rather as descriptions of features specific to particular implementations of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the invention have been described. Other implementations are within the scope of the following claims.

What is claimed is:

1. A cargo transporting apparatus comprising:
   a bed portion, having an upper surface adapted to support a load;
   a tail portion connected to the bed portion by a main hinge, with the tail portion having an upper surface adapted to support a load;
   a hinge actuating mechanism including first and second rigid linkages each having a first longitudinal end and a second longitudinal end, wherein the first longitudinal ends of the first and second rigid linkages are connected by a first pivot, the second longitudinal end of the first rigid linkage is pivotably connected to the bed portion at a second pivot, and the second longitudinal end of the second rigid linkage is pivotably connected to the tail portion at a third pivot;
   a linear actuator having a first end connected to at least one of the first and second rigid linkages and having a second end connected to one of the bed portion or the tail portion, wherein the linear actuator, when in a retracted position, causes the first pivot to be positioned above a line between the second and third pivots and the tail portion to be in a raised position and the linear actuator, when in an extended position, causes the first pivot to be positioned below a line between the second and third pivots and the tail portion to be in a lowered position; and
   wherein the first end of the linear actuator is connected to at least one of the first and second rigid linkages at a position that is offset from a rotational axis of the first pivot.

2. The apparatus of claim 1 wherein the hinge actuating mechanism is constructed such that at least one of the first linkage or the second linkage contacts an underside of the tail portion when the linear actuator is in a retracted position.

3. The apparatus of claim 2 wherein the at least one of the first linkage or the second linkage is configured to contact the underside of the tail portion along a significant portion of a longitudinal dimension of the respective linkage.

4. The apparatus of claim 2 wherein the hinge actuating mechanism is constructed such that weight of the tail portion is removed from the linear actuator when at least one of the first linkage or the second linkage is in contact with the underside of the tail portion.

5. The apparatus of claim 2 wherein the linear actuator, when in the retracted position, holds the at least one of the first linkage or the second linkage against the underside of the tail portion.

6. The apparatus of claim 1 wherein the second end of the linear actuator is connected to the tail portion.

7. The apparatus of claim 1 comprising first and second hinge actuating mechanisms spaced apart along a dimension of an axis of the main hinge, and further comprising a brace between at least one of the corresponding first linkages or the corresponding second linkages of the first and second hinge actuating mechanisms.

8. The apparatus of claim 1 wherein the hinge actuating mechanism is constructed such that at least one of the first linkage or the second linkage is adapted to contact a support surface when the linear actuator is in at least a substantially extended position.

9. The apparatus of claim 1 wherein the first end of the linear actuator is connected to the second rigid linkage and the second end of the linear actuator is connected to the tail portion.

10. The apparatus of claim 9 wherein the second longitudinal end of the first rigid linkage is pivotably connected to the bed portion longitudinally adjacent to the main hinge and the second longitudinal end of the second rigid linkage is pivotably connected to the tail portion at a longitudinal distance from the main hinge.

11. The apparatus of claim 10 wherein the first end of the linear actuator is connected to the second rigid linkage via a brace between the second rigid linkage of the hinge actuating mechanism and a corresponding second rigid linkage of a second hinge actuating mechanism connected to the bed portion and tail portion and laterally spaced from the hinge actuating mechanism.

12. A trailer, comprising:
    a first load-bearing surface;
    a second load-bearing surface connected to the first load-bearing surface by a hinge;
    a first rigid linkage having a first longitudinal end and a second longitudinal end, wherein the first longitudinal end of the first rigid linkage is pivotably connected to the first load-bearing surface at a first pivot;
    a second rigid linkage having a first longitudinal end and a second longitudinal end, wherein the second longitudinal end of the first rigid linkage is pivotably connected to the first longitudinal end of the second rigid linkage at a second pivot, and the second longitudinal end of the second rigid linkage is pivotably connected to the second load-bearing surface at a third pivot; and
    wherein:
       when a rotational axis of the second pivot is positioned above a line between rotational axes of the first and third pivots:
          the second load-bearing surface is maintained in a raised position; and a distance between the first pivot and the second pivot is substantially the same as the distance between the second pivot and the third pivot; and when the rotational axis of the second pivot is positioned below a line between the rotational axes of the first and third pivots, the second load-bearing is in a lowered position.

13. The trailer of claim 12 further comprising a linear actuator having a first end connected to at least one of the first and second rigid linkages and having a second end connected to one of the first load-bearing surface or the second load-bearing surface, wherein the linear actuator, when in a retracted position, causes the rotational axis of the second pivot to be positioned above the line between the rotational axes of the first and third pivots and the linear actuator, when in an extended position, causes the rotational axis of the second pivot to be positioned below the line between the rotational axes of the first and third pivots.

14. The trailer of claim 13 wherein, when the second load-bearing surface is in the lowered position, the first and second load-bearing surfaces are rotated with respect to one another relative to when the second load-bearing surface is in the raised position.

15. The trailer of claim 14 wherein, when the second load-bearing surface is in the lowered position, the second load-bearing surface provides a ramp to the first load-bearing surface.

16. The trailer of claim 15 wherein at least one of the first and second rigid linkages is adapted to contact an underside of the second load-bearing surface in the raised position and to thereby remove weight from the linear actuator.

17. The trailer of claim 12 further comprising:
a third rigid linkage having a first longitudinal end and a second longitudinal end, wherein the first longitudinal end of the third rigid linkage is pivotably connected to the first load-bearing surface at a fourth pivot;
a fourth rigid linkage having a first longitudinal end and a second longitudinal end, wherein the second longitudinal end of the third rigid linkage is pivotably connected to the first longitudinal end of the fourth rigid linkage at a fifth pivot, and the second longitudinal end of the fourth rigid linkage is pivotably connected to the second load-bearing surface at a sixth pivot; and
wherein, when a rotational axis of the fifth pivot is positioned above a line between rotational axes of the fourth and sixth pivots, the second load-bearing surfaces is maintained in a raised position and, when the rotational axis of the fifth pivot is positioned below a line between the rotational axes of the fourth and sixth pivots, the second load-bearing surfaces is in a lowered position.

18. The trailer of claim 17 further comprising:
a first linear actuator having a first end connected to at least one of the first and second rigid linkages and having a second end connected to one of the first load-bearing surface or the second load-bearing surface;
a second linear actuator having a first end connected to at least one of the third and fourth rigid linkages and having a second end connected to one of the first load-bearing surface or the second load-bearing surface;
wherein the first and second linear actuators, when in a retracted position, cause the rotational axis of the second and fifth pivots to be positioned above the lines between the rotational axes of the first and third pivots and the fourth and sixth pivots, respectively, and the linear actuator, when in an extended position, causes the rotational axis of the second and fifth pivots to be positioned below the line between the rotational axes of the first and third pivots and the fourth and sixth pivots, respectively.

19. The trailer of claim 18 further comprising a controller for controlling operating of the first and second linear actuators.

20. A cargo transporting apparatus comprising:
a bed portion, having an upper surface adapted to support a load;
a tail portion connected to the bed portion by a main hinge, with the tail portion having an upper surface adapted to support a load;
a hinge actuating mechanism including first and second rigid linkages each having a first longitudinal end and a second longitudinal end, wherein the first longitudinal ends of the first and second rigid linkages are connected by a first pivot, the second longitudinal end of the first rigid linkage is pivotably connected to the bed portion at a second pivot, and the second longitudinal end of the second rigid linkage is pivotably connected to the tail portion at a third pivot;
a linear actuator having a first end connected to at least one of the first and second rigid linkages and having a second end connected to one of the bed portion or the tail portion, wherein the linear actuator, when in a retracted position, causes the first pivot to be positioned above a line between the second and third pivots and the tail portion to be in a raised position and the linear actuator, when in an extended position, causes the first pivot to be positioned below a line between the second and third pivots and the tail portion to be in a lowered position; and
wherein a distance between the first pivot and the second pivot is substantially the same as the distance between the first pivot and the third pivot.

* * * * *

UNITED STATES PATENT AND TRADEMARK OFFICE
CERTIFICATE OF CORRECTION

| | | |
|---|---|---|
| PATENT NO. | : 10,759,323 B1 | Page 1 of 1 |
| APPLICATION NO. | : 15/691695 | |
| DATED | : September 1, 2020 | |
| INVENTOR(S) | : Abraham Harms et al. | |

It is certified that error appears in the above-identified patent and that said Letters Patent is hereby corrected as shown below:

On the Title Page

Column 1, Item (72), Line 1, delete "Abraham Harms" and insert --Abram Harms--.

Signed and Sealed this
Thirtieth Day of April, 2024

Katherine Kelly Vidal
*Director of the United States Patent and Trademark Office*